(12) United States Patent
Endo et al.

(10) Patent No.: US 6,992,413 B2
(45) Date of Patent: Jan. 31, 2006

(54) BICYCLE HUB DYNAMO WITH A FREEWHEEL

(75) Inventors: Takahiro Endo, Sakai (JP); Takanori Kanehisa, Sakai (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/648,948

(22) Filed: Aug. 26, 2003

(65) Prior Publication Data

US 2004/0079612 A1    Apr. 29, 2004

(30) Foreign Application Priority Data

Aug. 26, 2002   (JP) ............................. 2002-245687

(51) Int. Cl.
*B60B 27/00* (2006.01)

(52) U.S. Cl. ..................... 310/67 A; 310/216; 310/254

(58) Field of Classification Search ............. 310/67 A, 310/67 R, 75 B, 98, 75 C, 75 D, 83, 99; 180/65.3, 65.4, 65.6, 65.2; 301/110.5, 105.1, 301/124.1
See application file for complete search history.

(56) References Cited

U.S. PATENT DOCUMENTS

| | | | | |
|---|---|---|---|---|
| 4,089,231 A | * | 5/1978 | Segawa | 474/160 |
| 5,667,233 A | * | 9/1997 | Metzinger | 280/238 |
| 6,435,622 B1 | * | 8/2002 | Kanehisa et al. | 301/110.5 |
| 6,559,564 B1 | * | 5/2003 | Itou | 310/67 A |

FOREIGN PATENT DOCUMENTS

| | | |
|---|---|---|
| CN | 2329589 Y | 7/1999 |
| DE | 4339409 A1 | 5/1995 |
| DE | 4400534 A1 | 7/1995 |
| DE | 19734681 A1 | 2/1999 |
| DE | 20017771 U1 | 12/2000 |
| EP | 591724 A1 | 4/1994 |
| EP | 982834 A1 | 3/2000 |
| EP | 1122094 A2 | 8/2001 |
| EP | 1213217 A2 | 6/2002 |
| JP | 48-103805-01 | 3/1973 |
| JP | 56-21664 | 5/1981 |
| JP | 10-29579 | 2/1998 |
| JP | 10-108428 | 4/1998 |
| JP | 2001037108 | * 2/2001 |

OTHER PUBLICATIONS

Patent Abstracts of Japan, vol. 2000, No. 19, dated Jun. 5, 2001; for JP 2001-037108 A (Mitsuba Corp), dated Feb. 9, 2001.

* cited by examiner

*Primary Examiner*—Burton S. Mullins
*Assistant Examiner*—Heba Elkassabgi
(74) *Attorney, Agent, or Firm*—James A. Deland (57) ABSTRACT

A bicycle hub dynamo comprises a hub spindle adapted to be mounted to a frame of the bicycle; a hub body disposed around the hub spindle, wherein the hub body has a pair of axially spaced hub flanges; a plurality of bearings disposed between the hub body and the hub spindle for rotatably supporting the hub body relative to the hub spindle; and a generator disposed between the hub body and the hub spindle, wherein the generator generates electricity in response to rotation of the hub body relative to the hub spindle. A freewheel is disposed on a first side of the hub body, wherein the freewheel is adapted to mount a plurality of sprockets.

17 Claims, 12 Drawing Sheets

BICYCLE HUB DYNAMO WITH A FREEWHEEL

BACKGROUND OF THE INVENTION

The present invention is directed to bicycles and, more particularly, to a bicycle hub dynamo with a freewheel that is adapted to support a plurality of sprockets.

The hub disposed in the center of a bicycle wheel typically comprises a hub spindle detachably and nonrotatably mounted on the bicycle fork (or frame), a hub body rotatably installed on the hub spindle, and bearings that rotatably support the hub body on the hub spindle. The hub body usually includes a pair of axially spaced hub flanges for coupling to the wheel spokes.

Sometimes a dynamo is housed inside the hub body, wherein the dynamo functions as a power supply for lighting or other applications. By incorporating the dynamo inside the hub body, generating efficiency is improved and resistance to wheel rotation is reduced relative to dynamos of the type that contact the wheel rim. Since conventional hub dynamos are used primarily for lighting applications, the dynamo usually is installed in the front hub of the front wheel so as to be near a headlight and to reduce the length of wiring accordingly.

More recently, electrical power from hub dynamos is used to power on-board electronic components in addition to headlights, and the distance from the front hub to the location of the electronic components, which may be at the center or rear of the bicycle frame, may be considerable. As a result, long electrical cables may need to be run along the bicycle frame. Longer electrical cables result in greater resistance in the cables, thus resulting in undesirable voltage drops and reduced power delivering efficiency. Furthermore, the area between the handlebars and the center and rear portions of the frame already is wired with brake cables, gear shifting cables, etc. Thus, routing additional cables for powering remotely located electronic components complicates the wiring scheme and clutters the bicycle frame.

SUMMARY OF THE INVENTION

The present invention is directed to various features of a bicycle hub dynamo. In one embodiment, a bicycle hub dynamo comprises a hub spindle adapted to be mounted to a frame of the bicycle; a hub body disposed around the hub spindle, wherein the hub body has a pair of axially spaced hub flanges; a plurality of bearings disposed between the hub body and the hub spindle for rotatably supporting the hub body relative to the hub spindle; and a generator disposed between the hub body and the hub spindle, wherein the generator generates electricity in response to rotation of the hub body relative to the hub spindle. A freewheel is disposed on a first side of the hub body, wherein the freewheel is adapted to mount a plurality of sprockets. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
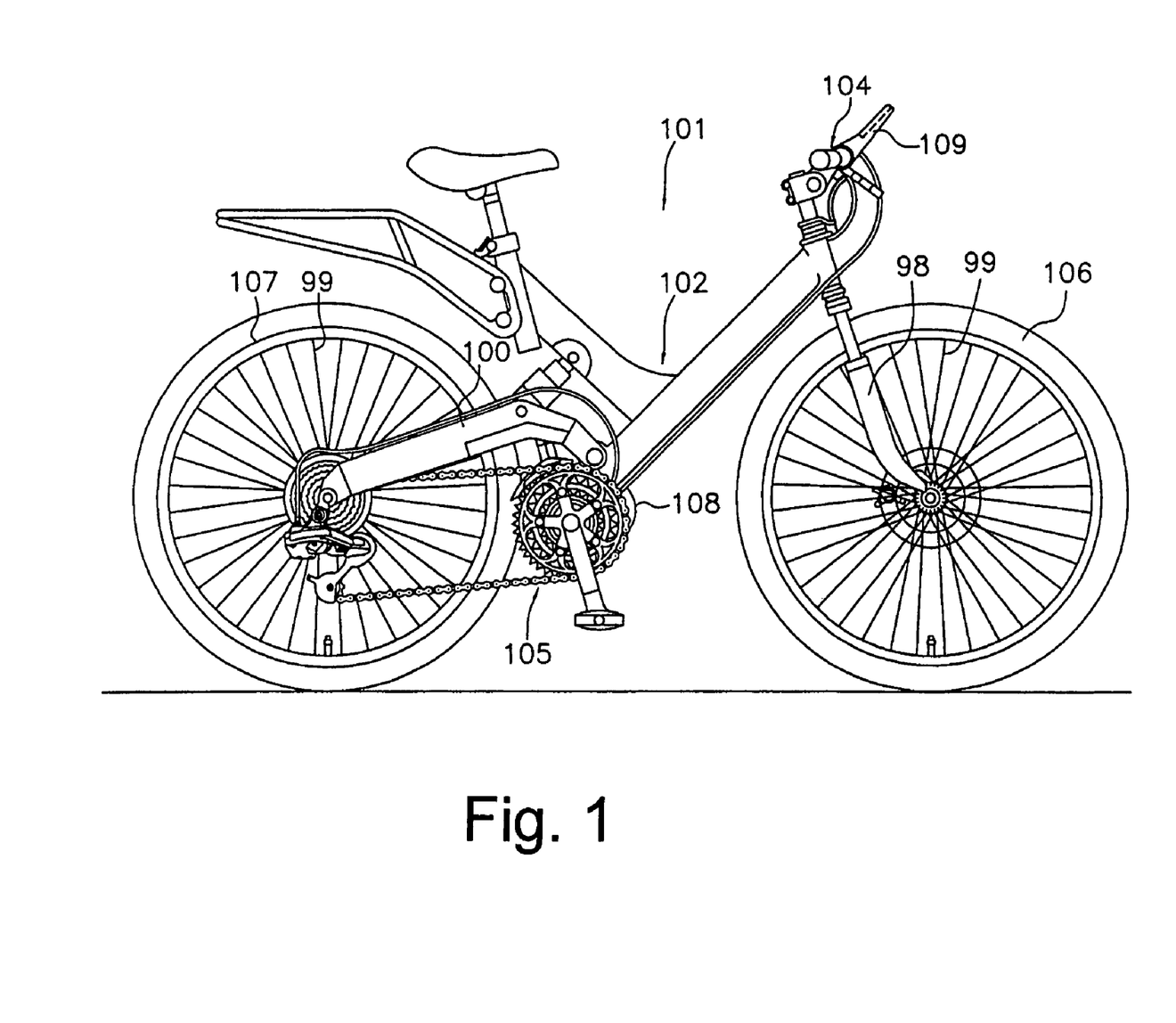
FIG. 1 is a side view of a bicycle that includes a hub dynamo with a freewheel.

FIG. 1 is a side view of a bicycle 101 that includes a hub dynamo with a freewheel. Bicycle 101 comprises a frame 102 having a front/rear suspension that includes a front suspension fork 98 and a rear swing arm 100; a handlebar 104 fastened to suspension fork 98; a drive portion 105 comprising a chain, pedals, derailleurs etc.; front and back wheels 106 and 107 mounted on suspension fork 98 and rear swing arm 100, respectively, through spokes 99; and two control devices 108 and 109 for controlling the two derailleurs and the front/rear suspension. Control device 108 is located in proximity to the bottom bracket at the bottom center of frame 102. Control device 109 has a display unit, and it is mounted on handlebar 104. A hub dynamo 1 (FIG. 2) is mounted on rear wheel 107, wherein power from hub dynamo 1 is supplied to control devices 108 and 109.

Figure 2:
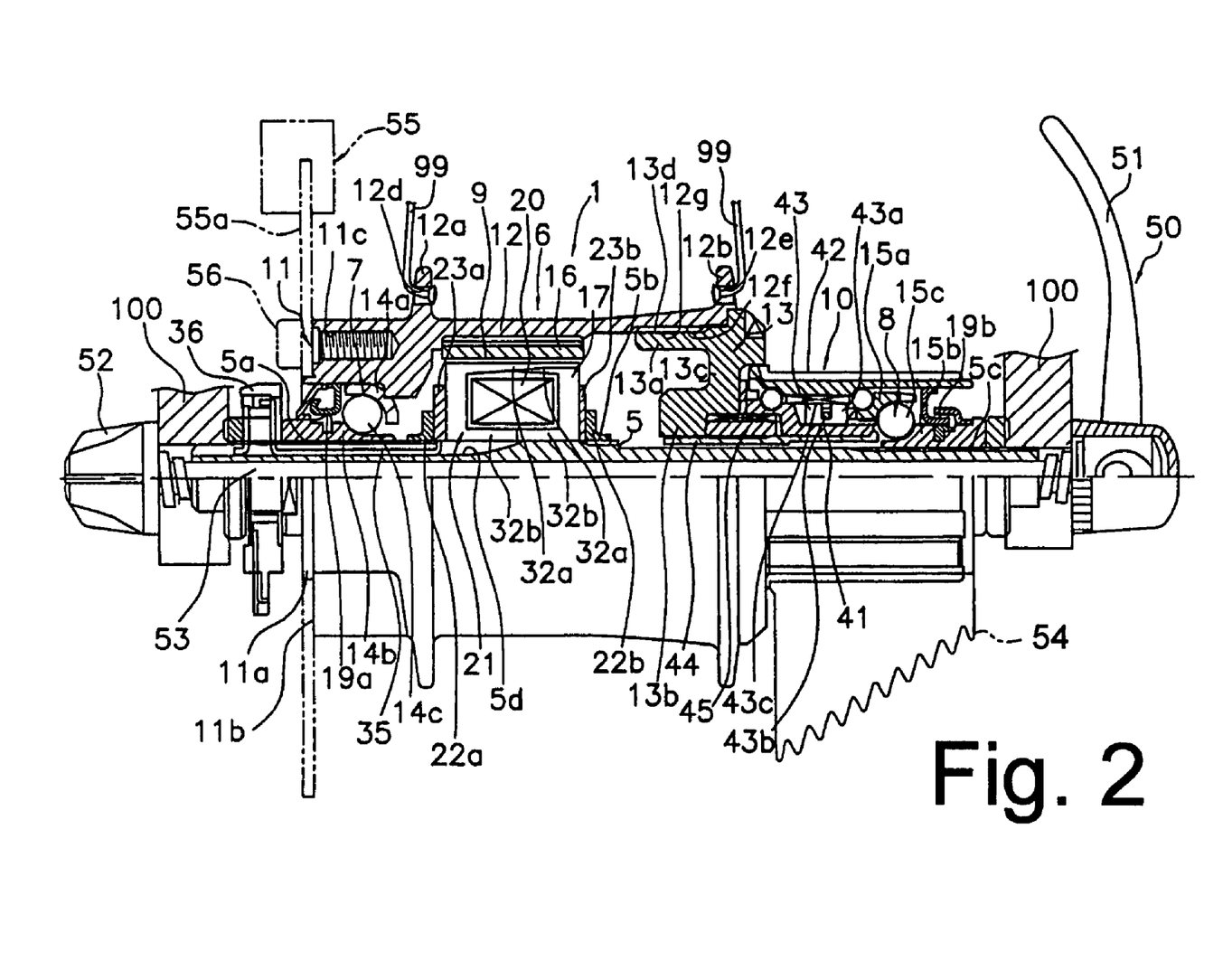
FIG. 2 is a partial cross sectional view of a particular embodiment of a hub dynamo with a freewheel.
Figure 3:
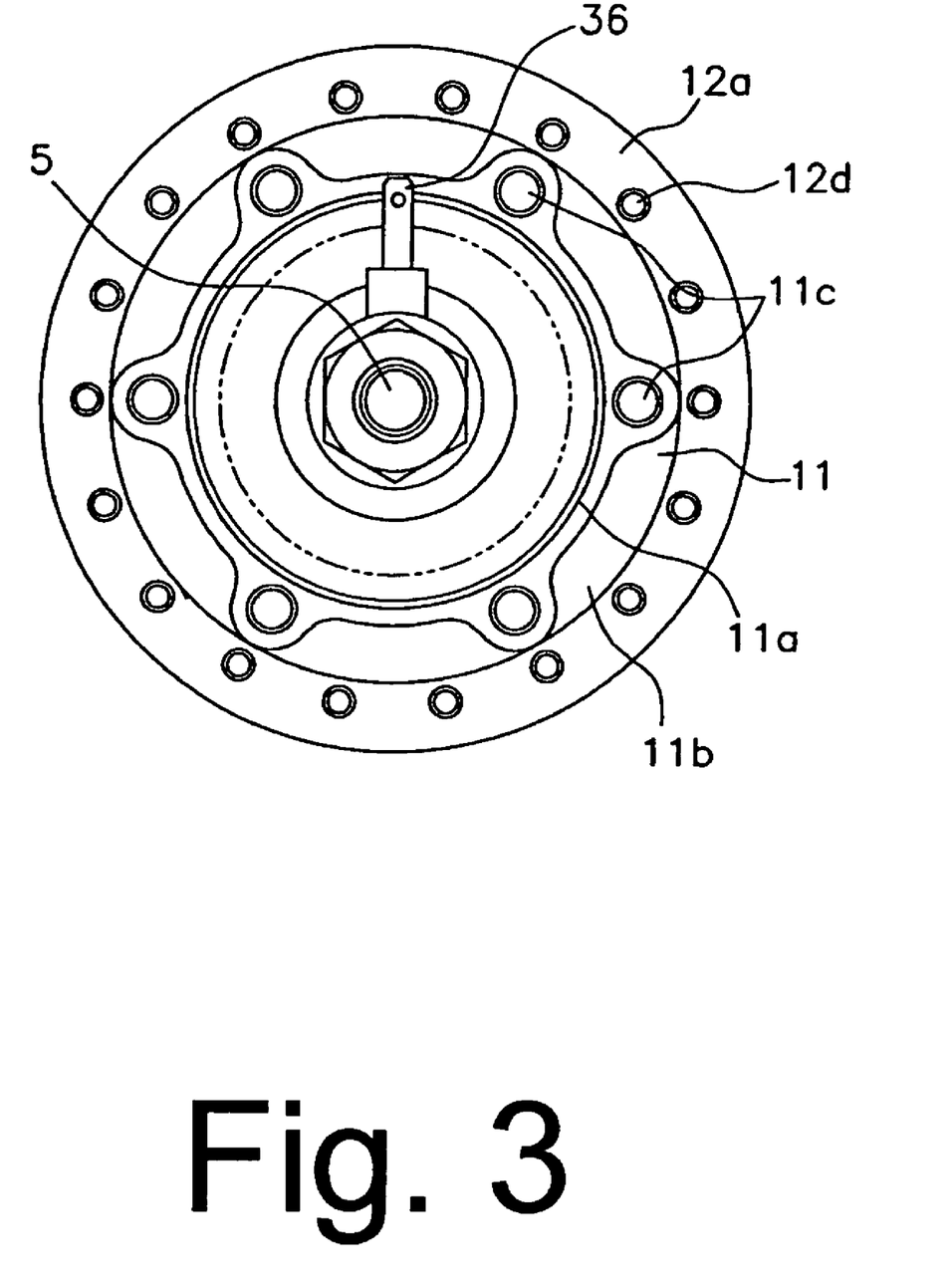
FIG. 3 is a side view of the hub dynamo.

FIG. 2 is a partial cross sectional view of a particular embodiment of hub dynamo 1. Hub dynamo 1 comprises a hub spindle 5 fastened at both ends to the rear end portion of swing arm 100; a hub body 6 disposed around hub spindle 5; a pair of bearings 7 and 8 for rotatably supporting the hub body 6 on the hub spindle 5; a generating mechanism 9 disposed between hub body 6 and hub spindle 5 for generating electricity in response to rotation of hub body 6 relative to hub spindle 5; a freewheel 10 disposed on the right side of hub body 6; and a brake mounting portion 11 disposed on the left side of hub body 6.

Hub spindle 5 is a cylindrical member fabricated of chromium-molybdenum steel, for example. The two ends of hub spindle 5 are fastened to the rear end of swing arm 100 by means of a conventional quick release mechanism 50 that includes a connecting shaft 53 with a cam lever 51 and nut 52 threaded onto the opposite ends of connecting shaft 53. Connecting shaft 53 extends through the interior of hub spindle 5. An output terminal 36 for outputting generated power is nonrotatably mounted at the left end of hub spindle 5, and a cord passage recess 5d is formed on the outer peripheral surface of hub spindle 5 for routing a connector cord 35 extending from the generating mechanism 9 to the output terminal 36.

Hub body 6 is fabricated from a lightweight aluminum alloy, for example, and it comprises a cylindrical case body 12 with a brake mounting portion (member) 11 at the left side and an opening 12f at the right side. A pair of axially spaced hub flanges 12a, 12b are formed on the outer peripheral surface of case body 12. A plurality of (e.g., sixteen) circumferentially evenly spaced spoke holes 12d and 12e are formed in the respective hub flanges 12a and 12b. The pitch of spoke holes 12d and spoke holes 12e are slightly out of phase by one-half pitch with respect to one another.

A brake mounting portion (member) 11 is disposed on the left side of case body 12. Brake mounting portion 11 comprises, for example, a ring-shaped projecting portion 11a for centering and mounting a brake disk 55a of a disk brake device 55; a mounting surface 11b facing projecting portion 11a; and six circumferentially spaced screw holes 11c formed in mounting face 11b for mounting brake disk 55a by means of bolts 56. A cover 19a is detachably mounted to the inner peripheral surface of brake mounting portion 11 for covering the gap with the hub spindle 5. Cover 19b may be fabricated from synthetic resin, for example.

The opening 12f of case body 12 is dimensioned to accommodate the installation, removal and/or maintenance of generating mechanism 9, and a cover member 13 is detachably mounted on case body 12 so as to cover opening 12f. Cover member 13 comprises an outer cylindrical portion 13a having an outer peripheral male threaded portion that engages a female threaded portion 12g formed on case body 12; an inner cylindrical portion 13b disposed radially inwardly of outer cylindrical portion 13a; and a linking portion 13c linking the outer cylindrical portion 13a and inner cylindrical portion 13b.

Bearing 7 is installed between case body 12 and hub spindle 5. Bearing 7 has a cup 14a disposed on the left side inner peripheral surface of case body 12; a cone 14b threaded onto a male threaded portion 5a of hub spindle 5; and balls 14c disposed between cone 14b and cup 14a in rolling contact with both members. Bearing 8 is disposed between freewheel 10 and hub spindle 5. Bearing 8 has a cup 15a disposed on freewheel 10; a cone 15b threaded onto a male threaded portion 5c of hub spindle 5; and balls 15c disposed between cup 15a and cone 15b in rolling contact with both members. Grease is packed around balls 14c and 15c.

Freewheel 10 has a cylindrical base member 41 nonrotatably linked to the inner peripheral side face of cover member 13; a cylindrical gear attachment member 42 rotatably mounted on base member 41; and a one-way clutch 43 disposed between base member 41 and gear attachment member 42. The head of a cylindrical linking bolt 44 is screwed into the inner peripheral surface of inner cylindrical portion 13b of cover member 13 for axially retaining base member 41 to cover member 13. Inner cylindrical portion 13b of cover member 13 and base member 41 are nonrotatably linked by means of a linking member 45 disposed between the two at the outer periphery of linking bolt 44. More specifically, splines formed on the outer peripheral surface of linking member 45 engage with splines formed on the inner peripheral surface of inner cylindrical portion 13b and with splines formed on the left side inner peripheral surface of base member 41. Cup 15a of bearing 8, which also serves as a bearing cone for supporting gear attachment portion 42, is screwed onto the right outer peripheral surface of base member 41. Freewheel 10 and cover member 13 may be removed as a unit, thus facilitating maintenance of the generating mechanism 9.

A plurality of sprockets 54 are nonrotatably but detachably mounted around the outer peripheral surface of gear attachment member 42. A cover member 19b is detachably mounted to the right side inner peripheral surface of gear attachment member 42 for covering the gap with the hub spindle 5. Cover member 19b may be fabricated from synthetic resin, for example.

One-way clutch 43 transmits forward rotation of the plurality of sprockets 54 (caused by forward rotation of the pedals) to base member 41 and prevents the transmission of forward rotation of the rear wheel 107 to the plurality of sprockets 54. More specifically, a pawl member 43a of one-way clutch 43 is pivotably mounted on base member 41, and pawl member 43a is biased radially outwardly by a spring member 43b. When gear attachment member 42 rotates in the forward direction, pawl member 43a meshes with a ratchet tooth 43c formed on the inner peripheral surface of gear attachment member 42, thus transmitting rotation from gear attachment member 42 to base member 41.

Generating mechanism 9 has a permanent magnet 16 fastened to case body 12 and a stator unit 17 fastened to hub spindle 5. The permanent magnet 16 is secured to the inner peripheral surface of case body 12, wherein permanent magnet 16 comprises four individual magnets that are evenly spaced in the circumferential direction. The permanent magnet 16 is magnetized with alternating N and S poles disposed at equal intervals, and each individual magnet faces radially outer portions of a yoke 21.

The stator unit 17 has a ring-shaped coil 20 and a yoke 21 that is disposed such that it surrounds the coil 20. The coil 20 and the yoke 21 are secured to the hub shaft 5 such that they are sandwiched by a pair of nuts 22a and 22b that are fastened to the male threaded portions 5a and 5b, respectively, formed on the outer peripheral surface of the hub shaft 5. Coil 20 and yoke 21 are positioned along the axial direction such that they face permanent magnet 16.

Figure 4A:
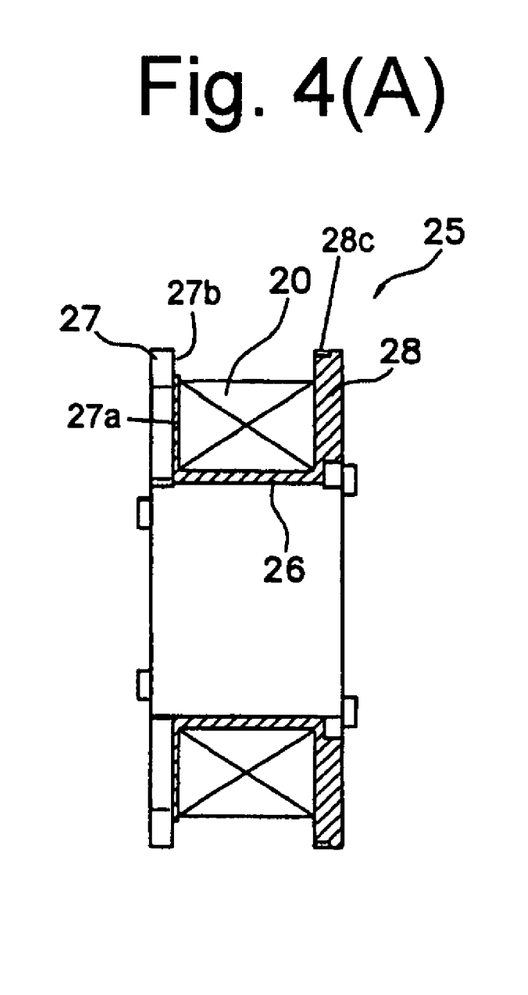
FIG. 4(A) is a cross-sectional view of a particular embodiment of a bobbin.
Figure 4B:
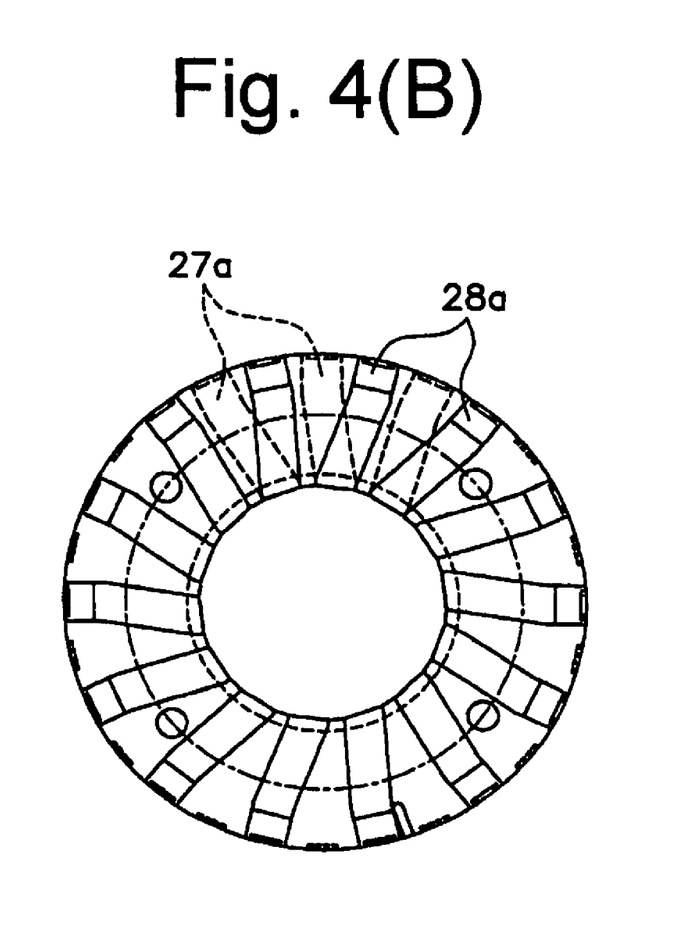
FIG. 4(B) is a side view of the bobbin.
Figure 5A:
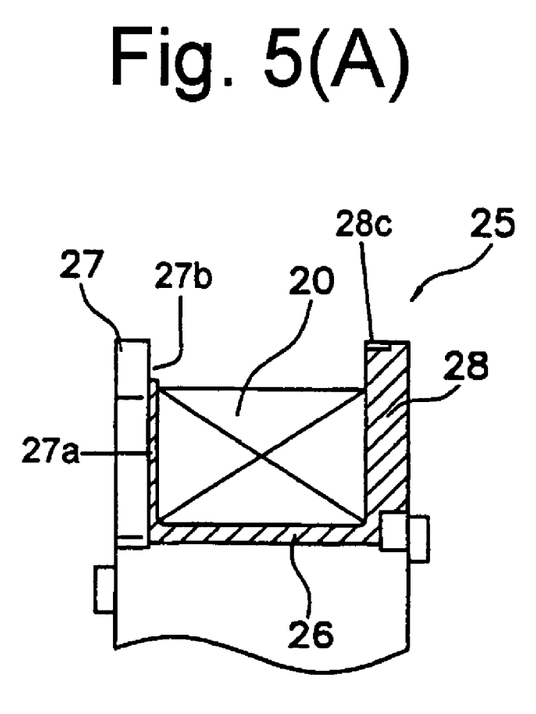
FIG. 5(A) is a more detailed cross-sectional view of the bobbin.
Figure 5B:
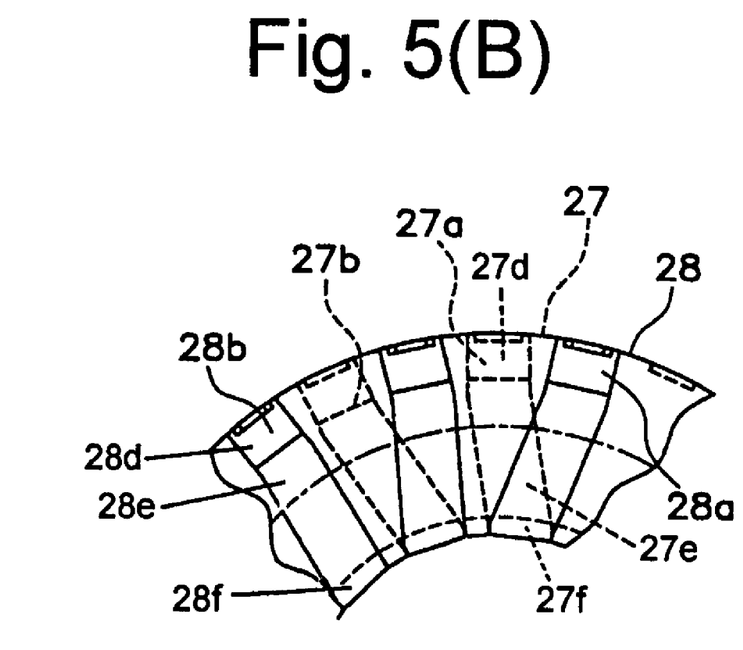
FIG. 5(B) is a more detailed side view of the bobbin.
Figure 6:
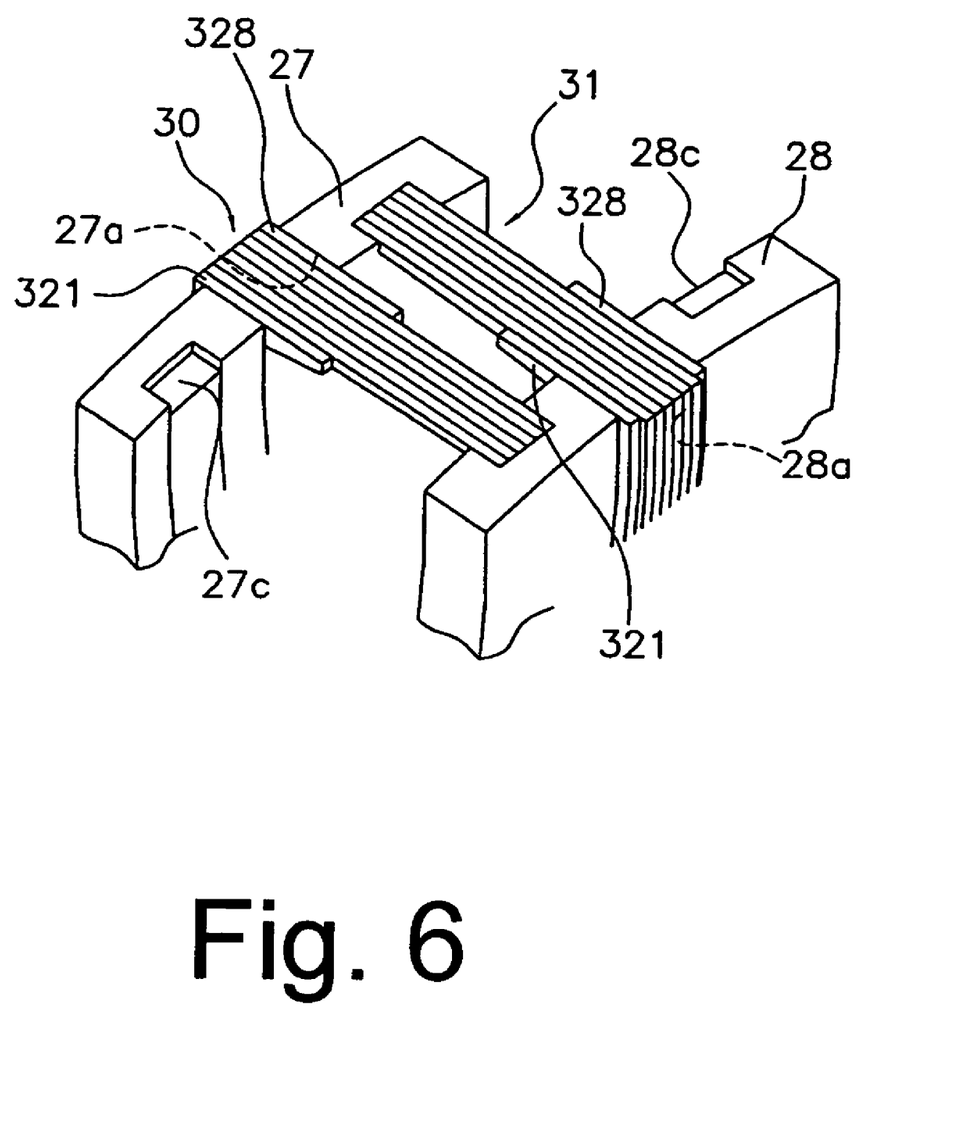
FIG. 6 is a perspective partial view of a particular embodiment of yoke arms installed in the bobbin.

Coil 20 is wound around a bobbin 25 as shown in FIGS. 4(A) and 5(A). Bobbin 25 has a tubular barrel 26, a first flange 27, and a second flange 28. First flange 27 and second flange 28 are formed at opposite axial ends of barrel 26, and coil 20 is wound around tubular barrel 26. As shown in FIGS. 4(B) and 5(B), grooves 27a and 28a are formed on the side surfaces of the first and second flanges 27 and 28, respectively, wherein grooves 27a and 28a extend in essentially a radial direction. These grooves 27a and 28a are formed such that, when viewed along the axial direction: (i) radially outer portions 27d and 28d of grooves 27a and 28a, respectively, are offset relative to each other, i.e., a radially outer portion 28d of a groove 28a of the second flange 28 is positioned between adjacent two radially outer portions 27d of grooves 27a of the first flange 27, (ii) the radially intermediate portions 27e and 28e of grooves 27a and 28a, respectively, partially overlap each other, and (iii), the radially inner portions 27f and 28f of grooves 27a and 28a, respectively, overlap virtually completely with each other. The radially outer portion 27d and 28d of each groove 27a and 28a is cut out to form a notch 27b or 28b, respectively. Furthermore, as shown in FIGS. 4(A), 5(A) and 6, a plurality of indentations 27c and 28c that have a prescribed length and run from the interior side toward the exterior side along the axial direction are formed in the parts of the outer circumferential surfaces of the flanges 27 and 28 in which no groove 27a or 28a is formed. In FIG. 6, some of the yoke arms are omitted in order to facilitate the description.

Figure 7:
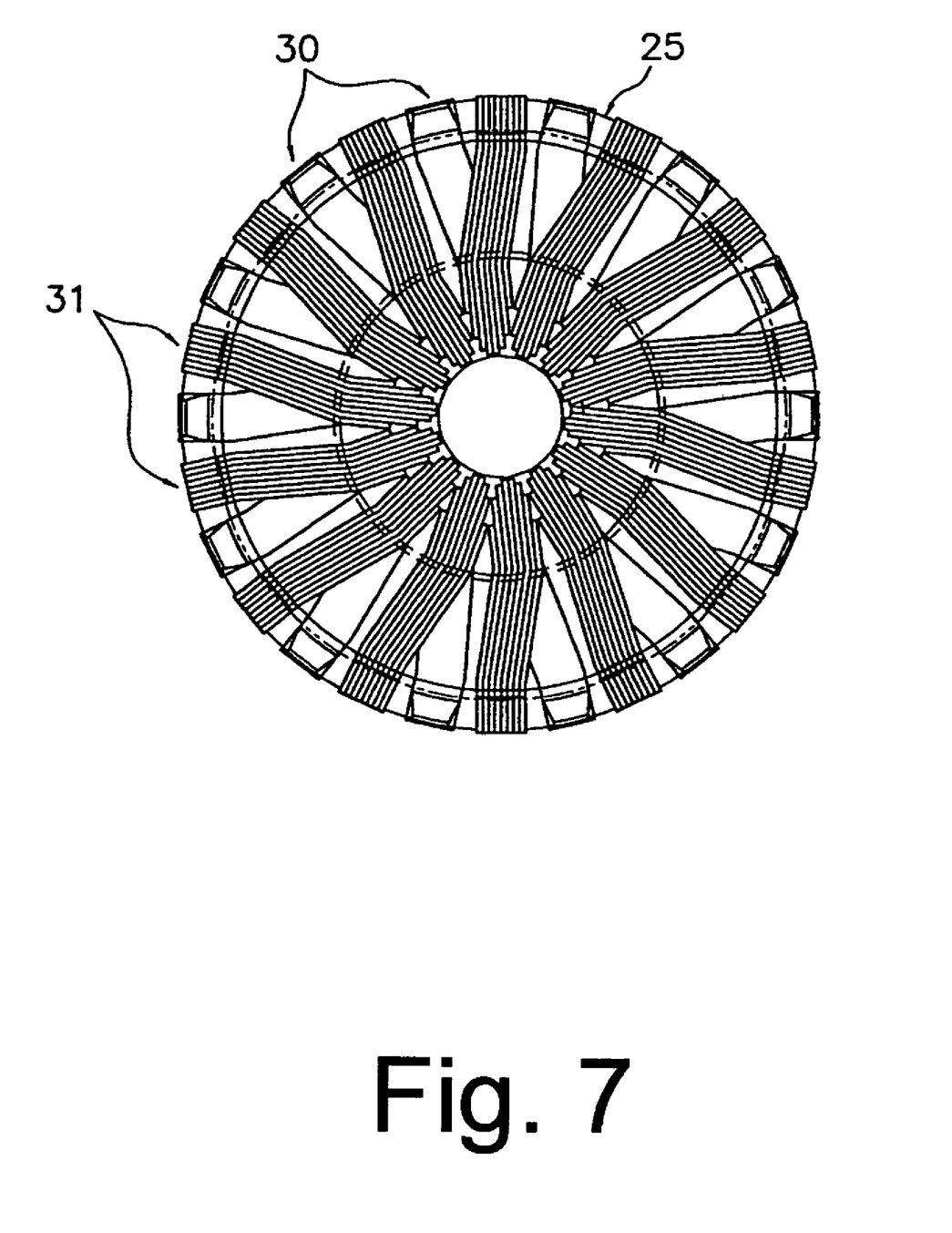
FIG. 7 a side view of the yoke arms installed in the bobbin.

FIGS. 6 and 7 show portions of the yoke 21 mounted to the bobbin 25. As shown therein, the yoke 21 comprises a plurality of first laminated yoke arms 30 and a plurality of second laminated yoke arms 31. Yoke arms 30 are mounted such that they engage with the grooves 27a of the first flange 27 of the bobbin 25, and yoke arms 31 are mounted such that they engage with the grooves 28a of the second flange 28 of the bobbin 25.

Figure 8:
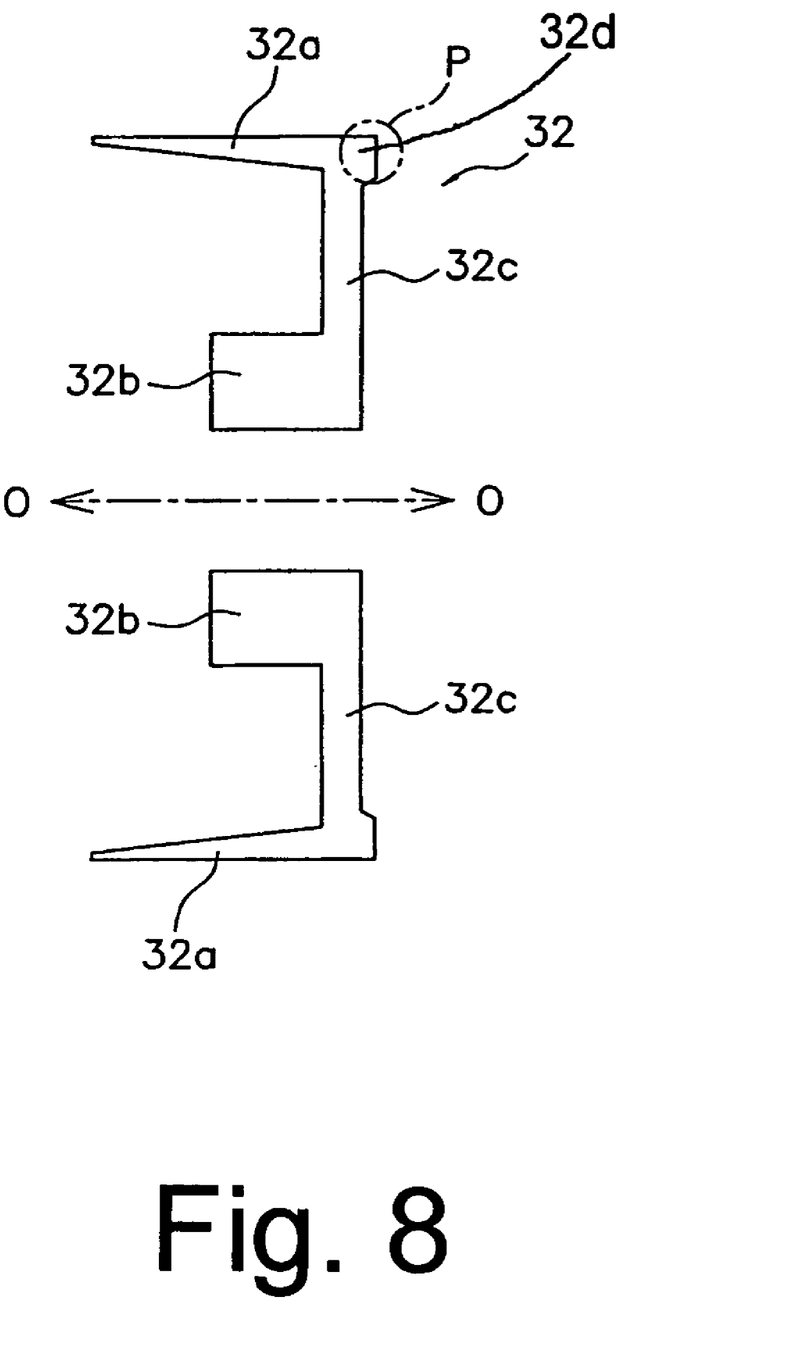
FIG. 8 is a front view of a particular embodiment of laminated plates used in the yokes.
Figure 9:
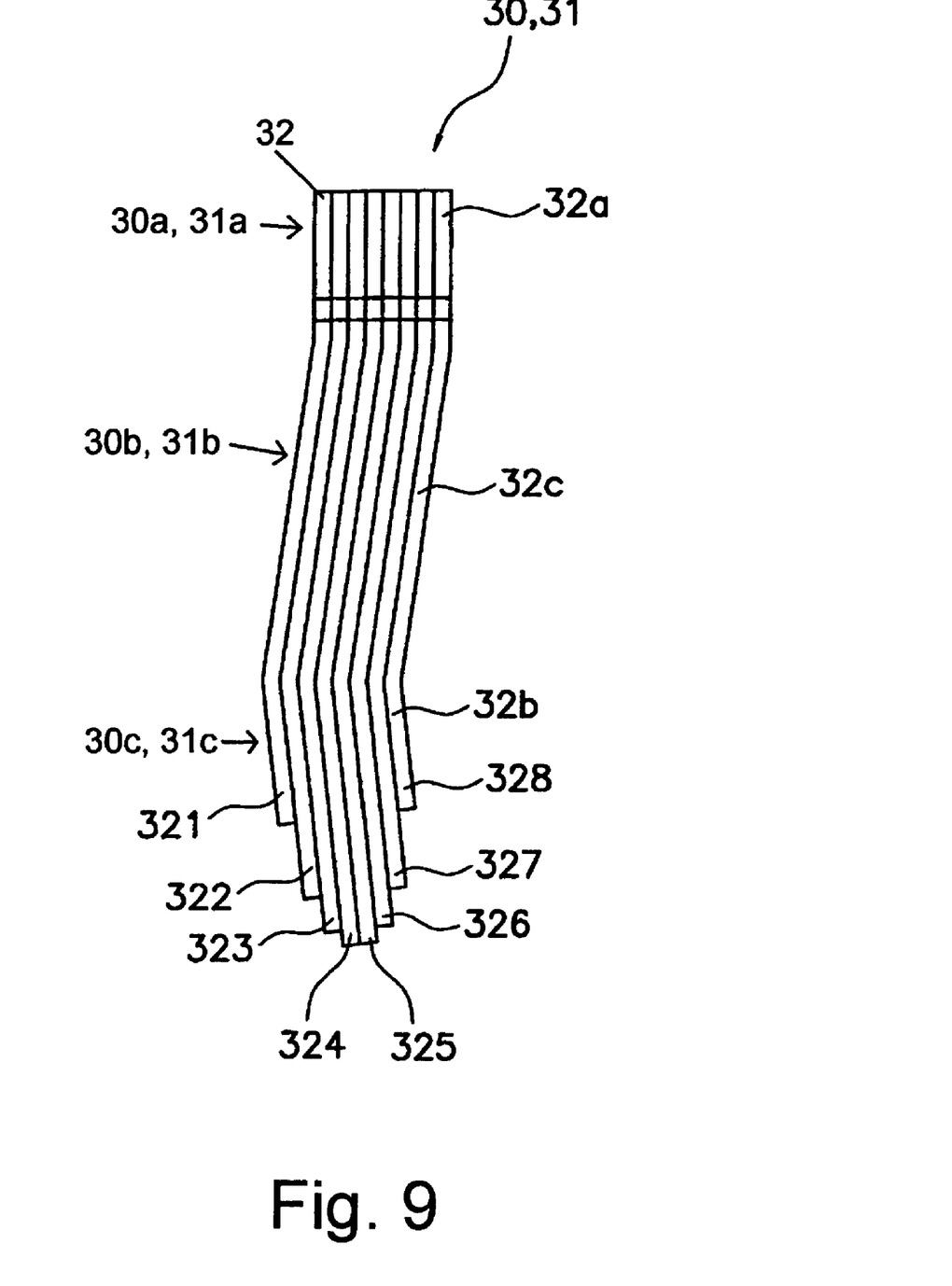
FIG. 9 is a side view of a particular embodiment of a yoke formed by a plurality of the laminated plates.

In this embodiment, each laminated yoke arm 30 and 31 is formed via lamination of a plurality of laminated plate-shaped pieces 32, as shown in FIGS. 7–9. Each plate-shaped piece 32 is formed from a silicon steel plate (more precisely, a non-directional silicon steel plate) on the surface of which an oxide coating is formed. Each plate-shaped piece 32 has essentially the same configuration wherein, as shown in FIG. 8, each plate-shaped piece has a radially outer portion 32a, a radially inner portion 32b, a linking (intermediate) portion 32c, and a notch engaging portion 32d. Consequently, each yoke arm 30 and 31 has respective yoke arm radially outer portion 30a and 31a, yoke arm radially inner portions 30b and 31b, and yoke arm linking (intermediate) portion 30c and 31c.

The linking portions 32c of the plate-shaped pieces 32 engage with the radially intermediate portions 27e, 28e of grooves 27a and 28a, respectively, formed in the flanges 27 and 28 of the bobbin 25. The radially outer portion 32a extends along the axis of the hub shaft 5 (i.e., along the O—O line in FIG. 8) from one end of the linking portion 32c (its proximal portion) and tapers toward its distal end. The radially inner portion 32b similarly extends from the other end of the linking portion 32c along the axis of the hub shaft 5. As shown in FIG. 9, these plate-shaped pieces 32 are formed such that the radially outer portion 32a and the radially inner portion 32b are positioned on different radial lines when viewed along the axial direction.

In this embodiment, the notch engaging portion 32d formed at the proximal end of each plate-shaped piece 32 engages with and is held in the notches 27b and 28b formed with the grooves 28a and 28b, respectively, of the flanges 27 and 28, and the distal end of the radially outer portion 32a of each plate-shaped piece 32 engages with and is held in the indentation 27c or 28c formed in the side of the flange 27 or 28 that is disposed on the opposite side of the bobbin 25. The notches 27b and 28b and/or the indentations 27c and 28c thus allow the plate-shaped pieces 32, and hence the yokes 27 and 28, to be reliably secured in the circumferential direction.

Each plate-shaped piece 32 has a thickness ranging from 0.25 mm to 1 mm, and a thickness of 0.5 mm is preferred from the standpoint of cost and performance. In this embodiment, each laminated yoke arm 30 and 31 is formed through the lamination of eight plate-shaped pieces 32. The lengths of the various plate-shaped pieces 32 differ. As shown in FIG. 9, the outermost pair of plate-shaped pieces 321 and 328 are the shortest radially, the next outermost pair of plate-shaped pieces 322 and 327 are next shortest radially, the next outermost plate-shaped pieces 323 and 326 are next shortest radially, and the innermost pair of plate-shaped pieces 324 and 325 are longest radially. Forming the various plate-shaped pieces with these lengths enables a more efficient construction, wherein the radially inner portions of adjacent laminated yoke arms along the circumferential direction do not touch each other and the cross-sectional areas of the magnetic paths are largest.

Furthermore, as shown in FIG. 6, the outermost plate-shaped pieces 321 and 328 of each yoke arm 30 and 31 along the circumferential direction are formed such that their radially outer portions 32a have a length in the axial direction that is approximately half that of the other plate-shaped pieces. This is intended to prevent the plate-shaped pieces 321 and 328 that are adjacent to each other along the circumferential direction from touching each other, and to minimize the leakage of magnetic flux therebetween.

Finally, as shown in FIG. 8, each plate-shaped piece 32 is formed such that the outside part of the area that connects the radially outer portion 32a and the linking portion 32c (the area P in FIG. 8) is not formed in an arc configuration, but rather in an acute angle configuration. Therefore, the distance to the permanent magnet 16 is reduced with regard to this area as well, thereby increasing magnetic flux in comparison with a yoke formed via conventional sheet metal pressing.

As shown in FIG. 2, the radially inner portions 32b of the plate-shaped pieces 32 forming the first and second laminated yoke arms 30 and 31 are positioned on the radially inner circumferential side of the coil 20, and the radially outer portions 32a of the plate-shaped pieces 32 are positioned between the coil 20 and the permanent magnet 16. Furthermore, as is clear from FIGS. 2 and 7, the radially inner portions 32b of the plate-shaped pieces 32 forming the first yoke arms 30 and the second yoke arms 31 are in direct magnetic contact. As a result, the cross-sectional area of the magnetic path through which the magnetic flux passes between the two sets of laminated yoke arms 30 and 31 can be maintained at an adequate level and magnetic saturation can be avoided. Therefore, members comprising other magnetic material are not necessary in order to connect the first yoke arms 30 and the second yoke arms 31, and the amount of resistance can be kept extremely small so that efficiency can be improved.

Figure 10:
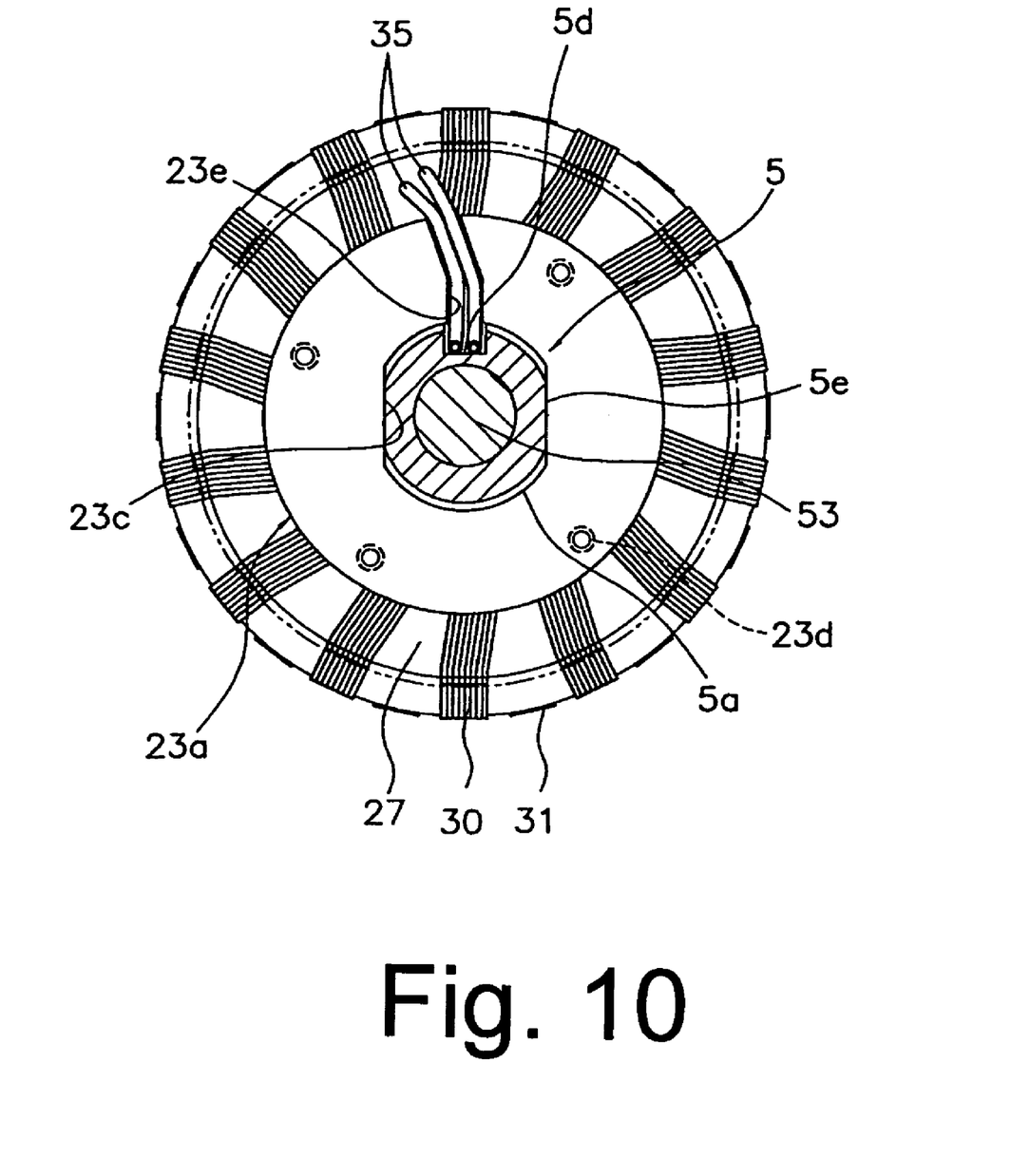
FIG. 10 is a side view of a locking structure for the stator unit.

As shown in FIG. 2, washers 23a, 23b are installed between yoke 21 and nuts 22a, 22b. As shown in FIG. 10, washer 23a has an approximately elliptical interlock hole 23c having mutually parallel faces for interlocking with chamfered portions 5e of hub spindle 5. As a result, washer 23a is nonrotatably interlocked with hub spindle 5. Washer 23a also has machined projecting portions 23d that project towards first flange 27 for interlocking with projecting portions on first yoke arm 30. Also formed in washer 23a is a slit 23e for passing connector cord 35 extending from coil 20. Slit 23e extends radially outwardly from a location in washer 23a that aligns with cord passage recess 6d. Thus, washer 23a locks stator unit 17 with respect to hub spindle 5 so that the connector cord 35 from coil 20 can be accurately guided to cord passage recess 5d. Connector cord 35 extends through the inner periphery of bearing 7, out from the hub body 6, and connects to output terminal 36 disposed on hub spindle 5.

The generation of power carried out by the hub dynamo 1 will now be explained. Forward rotation of the pedals is communicated to the plurality of sprockets 55 by the chain 105, and this forward rotation is communicated to base member 41, cover member 13 and hub body 6 through one-way clutch 43. As a result, case body 12, rotates relative to the hub shaft 5, and the permanent magnet 16 rotates relative to the stator unit 10 fixed to the hub shaft 5. When pedaling stops, the pawl 43a slides over the ratchet teeth 43c formed on the inner peripheral surface of gear attachment member 42, thus preventing the rotation of rear wheel 107 from being transmitted back to the pedals. In this state, the pedals may be stationary, but the case body 12 may continue rotating relative to the hub spindle 5.

The permanent magnet 16 rotates around the coil 20 and the radially outer portions 32a of the plate-shaped pieces 32 forming yoke 21. When the radially outer portions 32a of the plate-shaped pieces 32 forming the first yoke arm 30 receive N-pole magnetic flux from the permanent magnet 16, then the radially outer portions 32a of the plate-shaped pieces 32 forming the second yoke arm 31 receive S-pole magnetic flux. Conversely, when the radially outer portions 32a of the plate-shaped pieces 32 forming the first yoke arms 30 receive S-pole magnetic flux from the permanent magnet 16, then the radially outer portions 32a of the plate-shaped pieces 32 forming the second yoke arm 31 receive N-pole magnetic flux.

By virtue of the rotation of the permanent magnet 16 around the radially outer portions 32a of the plate-shaped pieces 32 forming the first and second yoke arms 30 and 31, the hub dynamo 1 repeatedly alternates between a first state in which the first yoke arms 30 comprise the N pole and the second yoke arms 31 comprise the S pole, and a second state in which the first yoke arms 30 comprise the S pole and the second yoke arms 31 comprise the N pole. As a result, alternating magnetic flux occurs in the radially inner portions 32b of the plate-shaped pieces 32 forming the yoke arms 30 and 31 that magnetically link both yoke arms 30 and 31. This also produces an alternating magnetic flux inside the coil 20, current flows through the coil 20, and power is generated. Because each yoke arm 30 and 31 comprises laminated plate-shaped pieces 32, the generation of eddy currents can be minimized in comparison with the conventional pressed sheet metal construction.

The generated power is delivered via output terminal 36 to electronic components such as control devices 108, 109, the front and rear derailleurs, the suspension, and so on. Since hub dynamo 1 is disposed on the rear wheel 107, electronic components situated closer to the rear wheel can be provided with power very efficiently over shorter distances and with fewer wires.

Figure 11:
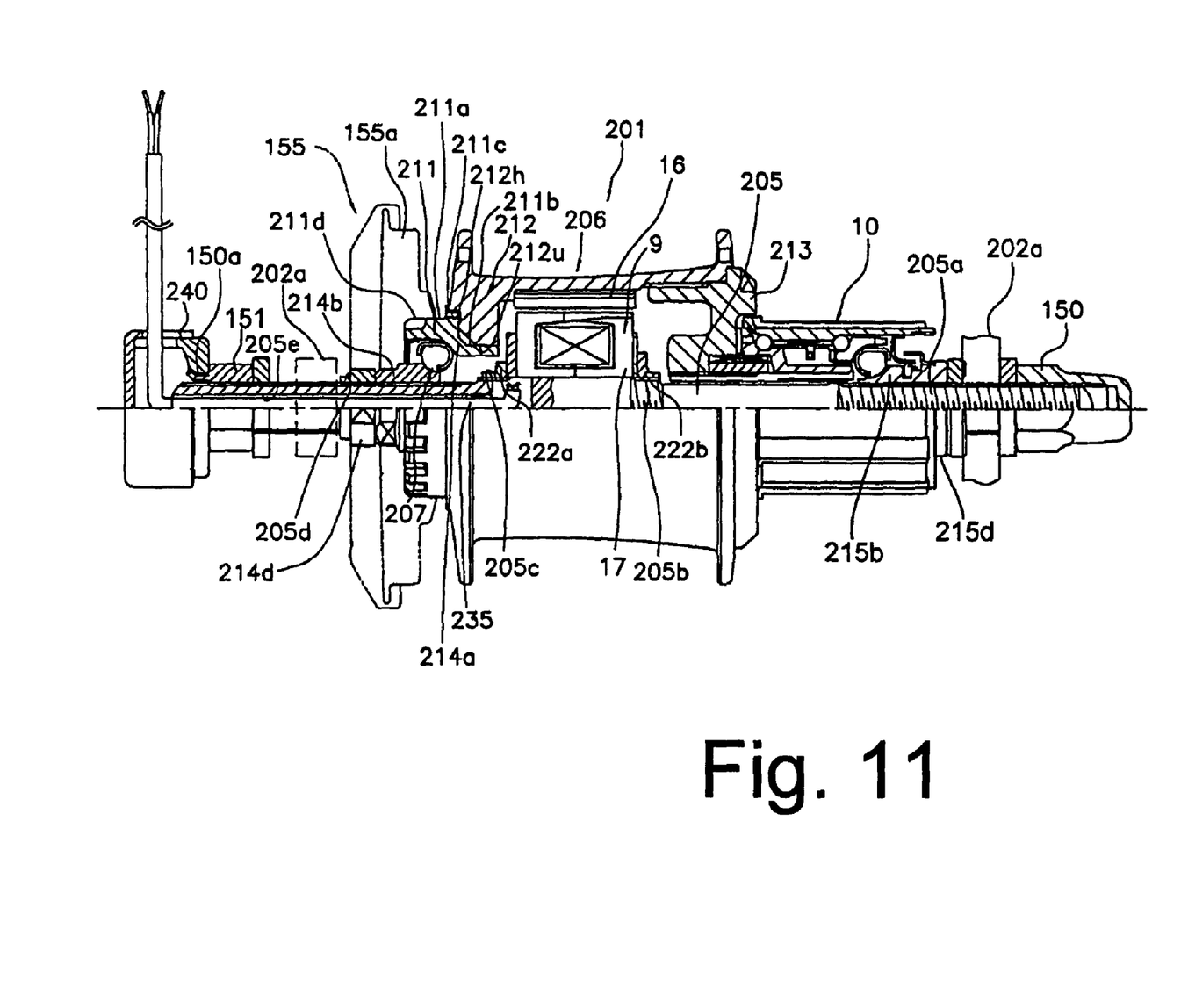
FIG. 11 is a partial cross sectional view of another embodiment of a hub dynamo with a freewheel.

In the embodiment described above, a hub dynamo having a quick release mechanism 50 was described. However, as shown in FIG. 11, a hub dynamo 201 may be attached to the back end 202a of a bicycle frame by means of ordinary nuts 150 and 151. Also, a brake mounting device 211 for centering and mounting a brake drum 155a of a roller brake 155 may be formed as a separate part from case body 212.

In FIG. 11, a hollow rod-shaped hub spindle 205 has male threaded portions 205a–205d formed on the outer peripheral surface, and the stator unit 17 of a generating mechanism 9 is affixed to hub spindle 205. More specifically, nut 150, a lock nut 215d, and a cone 215b are screwed onto male threaded portion 205a; nuts 222a and 222b are screwed onto male threaded portions 205c and 205b, respectively, for retaining the stator unit 17 of generating mechanism 9; and nut 151, a lock nut 214d, and a cone 214b are screwed onto male threaded portion 205d. A connector cord 235 for drawing power passes through a cord passage hole 205e that extends from stator unit 17 to the left end of hub spindle 205.

Freewheel 10 and hub body 206 having a permanent magnet 16 installed therein are generally similar in arrangement to the first embodiment. However, as noted above, the attachment structure for brake mounting device 211 differs from the first embodiment. More specifically, a mounting recess 212h having splines for locking brake mounting device 211 and a press-fitting hole 212u are formed on the left side inner peripheral surface of hub body 206. Brake mounting device 211 is a stepped cylindrical member having a larger diameter outer peripheral surface 211a and a smaller diameter outer peripheral surface 211b. Splines 211c formed on the large-diameter outer peripheral surface 211a of brake mounting device 211 engage with the splines formed on mounting recess 212h, and the smaller diameter outer peripheral surface 211b of brake mounting device 211 is securely press-fit into case body 212. Splines 211d are formed on the left side of brake mounting device 211 for nonrotatably interlocking with corresponding splines formed on brake drum 155a. Brake mounting device 211 also serves as the cup 214a of a bearing 207.

A flaring interlock cylinder portion 150a projects from the left end of nut 151, and a synthetic resin protector cover 240 for protecting a flexed portion of connector cord 235 is rotatably attached to interlock cylinder portion 150a. Protecting connector cord 235 by means of protector cover 240 in this way makes connector cord 235 more resistant to wire breakage in the event of an accident. Additionally, since protector cover 240 is capable of rotation by 360°, connector cord 235 may be attached to the bicycle frame in any orientation, thus making connector cord 235 adaptable to any type of frame.

Figure 12:
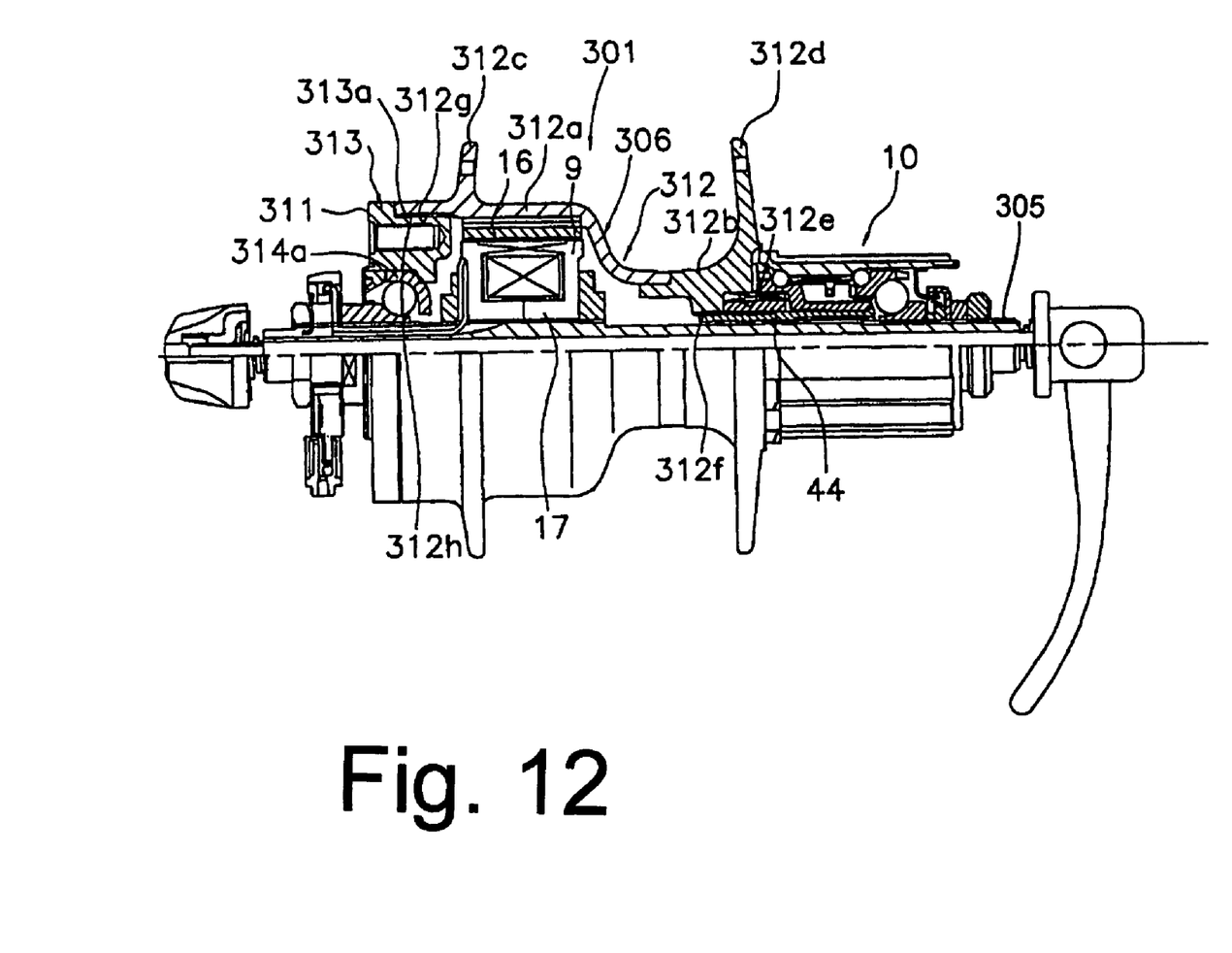
FIG. 12 is a partial cross sectional view of another embodiment of a hub dynamo with a freewheel.

In the two embodiments described previously, the hub bodies 6 and 206 were open at the side of the freewheel 10 for the installation, removal and/or maintenance of generator mechanism 9. However, as shown in FIG. 12, a hub dynamo 301 could be constructed with a hub body 306 having a multifunctional opening 312g at the side of a brake mounting device 311.

In this embodiment, a hub spindle 305 of a hub dynamo 301 is structured similar to hub spindle 5 in the first embodiment, and the stator unit 17 of a generating mechanism 9 is fastened to hub spindle 305. A hub body 306 comprises a case body 312 with a left hub shell 312a and a right hub shell 312b. Left hub shell 312a has stepped larger and smaller diameter outer peripheral surfaces, and a hub flange 312c extends radially outwardly from the larger outer peripheral surface. A flange 312d extends radially outwardly from right hub shell 312b.

A multifunctional opening 312g with a right-hand female threaded portion 312h is formed at the left end of left hub shell 312a for installing, removing and/or maintaining generating mechanism 9. A generally cylindrical cover member 313 has an outer peripheral right-hand male threaded portion that engages the right-hand female threaded portion 312h of left hub shell 312a. The cup 314a of a bearing 307 is mounted on cover member 313, and the left side of cover member 313 has the brake mounting device 311. The structure of brake mounting device 311 is generally similar to brake mounting portion 11 in the first embodiment, and it allows the centering and mounting of a brake disk of a disk brake. Since the cover member 313 is securely screwed onto hub body 306 by a right-hand thread, the hub body 306 attempts to rotate in the screw tightening direction during braking so that the cover member 313 does not loosen.

The permanent magnet 16 of generating mechanism 9 is affixed to the inner peripheral surface of the larger diameter portion of left hub shell 312a. The smaller diameter portion of left hub shell 312a is disposed to the right of permanent magnet 16 for reducing weight and improving appearance, and right hub shell 312b is press fit into the right end of this smaller diameter portion. A recess 312e having splines disposed on the inner peripheral surface thereof is formed on the right end of right hub shell 312b for mounting the freewheel 10. A linking bolt 44 screws into a female threaded portion 312f formed on the inner peripheral surface of right hub shell to retain freewheel 10 to right hub shell 312b. This freewheel 10 attachment structure is generally similar to that in the preceding embodiments.

While the above is a description of various embodiments of inventive features, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle hub dynamo comprising:
   a hub spindle adapted to be mounted to a frame of the bicycle;
   a hub body disposed around the hub spindle, wherein the hub body has a first end and a second end, and wherein the hub body has a pair of axially spaced hub flanges;
   a plurality of bearings disposed between the hub body and the hub spindle for rotatably supporting the hub body relative to the hub spindle;
   a generating mechanism disposed between the hub body and the hub spindle, wherein the generating mechanism generates electricity in response to rotation of the hub body relative to the hub spindle;
   a freewheel disposed on a first side of the hub body, wherein the freewheel is adapted to mount a plurality of sprockets, wherein the freewheel is attached to a cover member, and wherein the cover member covers an opening in the hub that has a diameter sufficient to allow removal of the generating mechanism therethrough; and
   a coupling structure disposed in a force transmission path between the cover member and the hub body to inhibit relative rotation between the cover member and the hub body.

2. The dynamo according to claim 1 further comprising a brake device mounting member disposed on a second side of the hub body.

3. The dynamo according to claim 2 further comprising a brake disk coupled to the brake device mounting member.

4. The dynamo according to claim 2 further comprising a brake drum coupled to the brake device mounting member.

5. The dynamo according to claim 2 further comprising a roller brake coupled to the brake device mounting member.

6. The dynamo according to claim 1 wherein the hub body has a threaded portion that engages a threaded portion of the cover member.

7. The dynamo according to claim 6 wherein the hub body has a female threaded portion that engages a male threaded portion of the cover member.

8. The dynamo according to claim 7 wherein the female threaded portion is a right-hand threaded portion.

9. The dynamo according to claim 1 wherein the generating mechanism comprises:
   a magnet disposed on an inner peripheral surface of the hub body; and
   a stator unit disposed radially inwardly of the magnet.

10. A bicycle hub dynamo comprising:
    a hub spindle adapted to be mounted to a frame of the bicycle;
    a hub body disposed around the hub spindle, wherein the hub body has a first side and a second side, and wherein the hub body has a pair of axially spaced hub flanges;
    a plurality of bearings disposed between the hub body and the hub spindle for rotatably supporting the hub body relative to the hub spindle;
    a generating mechanism disposed between the hub body and the hub spindle, wherein the generating mechanism generates electricity in response to rotation of the hub body relative to the hub spindle;
    a freewheel disposed on the first side of the hub body, wherein the freewheel is adapted to mount a plurality of sprockets,
    wherein the second side of the hub body defines an opening having a diameter sufficient to allow removal of the generating mechanism therethrough;
    a cover member disposed at the second side of the hub body; and
    a coupling structure disposed in a force transmission path between the cover member and the hub body to inhibit relative rotation between the cover member and the hub body.

11. The dynamo according to claim 10 further comprising a brake device mounting member disposed on the cover member.

12. The dynamo according to claim 11 wherein the hub body has a threaded portion that engages a threaded portion of the cover member.

13. The dynamo according to claim 12 wherein the hub body has a female threaded portion that engages a male threaded portion of the cover member.

14. The dynamo according to claim 13 wherein the female threaded portion is a right-hand threaded portion.

15. A bicycle hub dynamo comprising:
    a hub spindle adapted to be mounted to a frame of the bicycle;
    a hub body disposed around the hub spindle, wherein the hub body has a first side and a second side, and wherein the hub body has a pair of axially spaced hub flanges;
    a plurality of bearings disposed between the hub body and the hub spindle for rotatably supporting the hub body relative to the hub spindle;
    a generating mechanism disposed between the hub body and the hub spindle, wherein the generating mechanism generates electricity in response to rotation of the hub body relative to the hub spindle;
    a freewheel disposed on the first side of the hub body, wherein the freewheel is adapted to mount a plurality of sprockets;
    wherein the hub body comprises:
    a first cylindrical portion that houses the generating mechanism; and
    a second cylindrical portion having a smaller diameter than the first cylindrical portion.

16. The dynamo according to claim 15 further comprising a brake device mounting member disposed on the first cylindrical portion.

17. A bicycle hub dynamo comprising:
    a hub spindle adapted to be mounted to a frame of the bicycle;
    a hub body disposed around the hub spindle, wherein the hub body has a first side and a second side, and wherein the hub body has a pair of axially spaced hub flanges;
    a plurality of bearings disposed between the hub body and the hub spindle for rotatably supporting the hub body relative to the hub spindle;

a freewheel disposed on the first side of the hub body, wherein the freewheel is adapted to mount a plurality of sprockets;

a generating mechanism disposed between the hub body and the hub spindle, wherein the generating mechanism generates electricity in response to rotation of the hub body relative to the hub spindle, and wherein the generating mechanism comprises:

a magnet disposed on an inner peripheral surface of the hub body; and a stator unit disposed radially inwardly of the magnet, wherein the stator unit comprises:

a coil disposed radially inwardly of the magnet;

a yoke surrounding the coil, wherein the magnet rotates relative to the yoke around an axis, wherein the yoke comprises:

a plurality of laminated first yoke arms disposed on a first axial side of the coil, each first yoke arm having a first yoke arm radially outer portion and a first yoke arm radially inner portion, and each first yoke arm comprising a plurality of laminated first plate-shaped pieces;

a plurality of laminated second yoke arms disposed on a second axial side of the coil, each second yoke arm having a second yoke arm radially outer portion and a second yoke arm radially inner portion, and each second yoke arm comprising a plurality of laminated second plate-shaped pieces;

wherein each first yoke arm radially inner portion faces a corresponding second yoke arm radially inner portion in the axial direction;

wherein the plurality of first yoke arm radially outer portions extend axially toward the second axial side of the coil;

wherein the plurality of second yoke arm radially outer portions extend axially toward the first axial side of the coil; and wherein the plurality of first yoke arm radially outer portions are interleaved with the plurality of second yoke arm radially outer portions in a circumferential direction.

* * * * *